United States Patent [19]

Larsen et al.

[11] Patent Number: 5,734,256
[45] Date of Patent: Mar. 31, 1998

[54] APPARATUS FOR PROTECTION OF POWER-ELECTRONICS IN SERIES COMPENSATING SYSTEMS

[75] Inventors: Einar V. Larsen, Saratoga, N.Y.; Allen M. Ritter, Roanoke, Va.

[73] Assignee: General Electric Company, Fort Wayne, Ind.

[21] Appl. No.: 454,671

[22] Filed: May 31, 1995

[51] Int. Cl.⁶ .................................................. G05F 1/70
[52] U.S. Cl. ............................................................ 323/207
[58] Field of Search ................................. 323/205, 207, 323/208, 209; 307/102, 105; 363/54; 361/15, 16, 92

[56] References Cited

U.S. PATENT DOCUMENTS

| | | | |
|---|---|---|---|
| 3,825,815 | 7/1974 | Gyugyi et al. | 321/9 A |
| 4,513,240 | 4/1985 | Putman | 323/210 |
| 4,639,846 | 1/1987 | Dähler et al. | 363/39 |
| 4,651,265 | 3/1987 | Stacey et al. | 363/35 |
| 4,697,131 | 9/1987 | Schauder et al. | 318/762 |
| 4,805,082 | 2/1989 | Heinrich et al. | 363/129 |
| 4,812,699 | 3/1989 | Ogawa et al. | 310/316 |
| 4,843,513 | 6/1989 | Edris | 361/20 |
| 4,870,557 | 9/1989 | Stacey | 363/43 |
| 5,198,746 | 3/1993 | Gyugyi et al. | 323/207 |
| 5,202,583 | 4/1993 | Larsen et al. | 307/102 |
| 5,227,713 | 7/1993 | Bowler et al. | 322/58 |
| 5,287,288 | 2/1994 | Brennen et al. | 364/483 |
| 5,291,120 | 3/1994 | Leowald et al. | 323/209 |
| 5,319,534 | 6/1994 | Brennen | 363/40 |
| 5,319,535 | 6/1994 | Brennen | 363/40 |
| 5,343,139 | 8/1994 | Gyugyi et al. | 323/207 |
| 5,374,853 | 12/1994 | Larsen et al. | 307/102 |
| 5,384,528 | 1/1995 | Leowald et al. | 323/209 |
| 5,392,184 | 2/1995 | Unterlass et al. | 361/16 |
| 5,424,627 | 6/1995 | Clark et al. | 323/210 |
| 5,469,044 | 11/1995 | Gyugyi et al. | 323/207 |
| 5,489,838 | 2/1996 | Leowald et al. | 323/210 |

*Primary Examiner*—Adolf Berhane
*Attorney, Agent, or Firm*—Wayne O. Traynham; Enrique J. Mora

[57] ABSTRACT

An active power line conditioner circuit having a series compensation system arrangement utilizes a transformer-coupled three-phase voltage-source inverter. A conventional metal oxide varistor (MOV) and bypass breaker combination are provided on the line side of the coupling transformer. A solid-state thyristor shorting ("crowbar") switch is provided on the secondary side of the coupling transformer across the outputs of the three-phase voltage-source inverter (VSI). The crowbar switch circuitry utilizes a diode bridge with a thyristor on the dc side of the bridge resulting in the simplification that only one active device need be gated. Crowbar switching logic activates the crowbar switch based on the exceeding of a threshold voltage measured at the dc power source link to the voltage-source inverter. A direct measure of dc source link voltage is employed to determine when to trigger the conduction of the crowbar thyristor switch. The three-phase voltage-source inverter is provided with overcurrent protection circuitry that immediately blocks the active portion of each phase-leg whenever the current exceeds a predetermined level. In an alternative embodiment of the present invention, a thyristor-switched MOV device is provided across the dc source link in parallel with the dc source output and the dc link capacitor for fast switching of slight overcurrents which are passed by the VSI. This allows operation with a dc source voltage close to maximum system ratings, thereby making better utilization of the VSI power electronics.

24 Claims, 4 Drawing Sheets

5,734,256

APPARATUS FOR PROTECTION OF POWER-ELECTRONICS IN SERIES COMPENSATING SYSTEMS

FIELD OF THE INVENTION

This invention relates generally to active series compensation systems in electric power transmission systems and, more particularly, to the protection of the solid-state power-electronic devices in a series compensation system (SCS) against severe overcurrents caused during fault conditions.

BACKGROUND AND SUMMARY OF THE INVENTION

Series connected impedance compensating systems are generally known and used for the dynamic balancing of reactive voltages on a power transmission line in response to varying load demands. Traditionally, compensating circuits have often employed some form of series connected capacitor arrangement. It is also known to utilize active solid-state components as part of an overall series compensating system in electric power transmission networks. Such arrangements, often referred to as a Unified Power Flow Controller (UPFC) or an Active Power Line Conditioner (APLC), may employ voltage-source inverters to inject a voltage in series with the source such that the load voltage is of a desired magnitude and phase with respect to the source voltage. An example is of such a system is provided in U.S. Pat. No. 5,198,746 to Gyugyi et al., entitled "Transmission line Dynamic Impedance Compensation System".

Because the injected series voltage comprises only a small fraction of the total load voltage, series compensating systems are not very effective in controlling large current flows which can occur during fault conditions (e.g., due to lighting strikes or ground fault switching transients). In an electrical power transmission network (or "supply network") currents that flow during a short-circuit imposed on the network are predominantly governed by the source voltage and series line impedance of the network. During many fault conditions, such currents can potentially reach ten or twenty times the maximum rated current handling capacity of the power electronics used in conventional impedance compensating systems. Consequently, it is desirable to protect the active power electronics of such systems against damage due to high current surges associated with fault conditions. One approach to providing such protection is demonstrated by U.S. Pat. No. 5,287,288 to Brennen et al. which discloses an active power line conditioner that employs a pair of opposing thyristors for forming a "crowbar switch" across the ac output of a transformer-coupled series voltage-source inverter (VSI). The crowbar switch provides a shorting path for shunting excess currents and thereby protects the VSI.

In the Brennen et al. invention the dual thyristor crowbar switch is triggered by a somewhat complicated rectifying bridge and Zener diode arrangement that senses overcurrents by detecting overvoltages at the ac side of the series inverter. Such an arrangement requires many components and thus inevitably increases the expense and decreases the overall reliability of the compensation system. Accordingly, the present invention provides an improved overcurrent sensing arrangement that monitors voltage fluctuations at the dc side of the VSI and an improved crowbar switch structure that uses fewer active components and is easier to control. These improvements result in providing protection of power electronics for series compensating systems that is inherently more reliable, lower in cost and particularly suitable for use in three-phase power distribution systems.

In one exemplary embodiment of the present invention (FIGS. 3 and 4), a conventional metal oxide varistor (MOV) —bypass breaker combination may be provided on the line side of the coupling transformer. An improved current shunting thyristor "crowbar" switch ($S_{CB}$) is also provided on the ac side of the transformer across the output of the voltage-source inverter (VSI). Each power phase leg of the VSI has three states with respect to the gating of the active portion, namely "high", "low", or "blocked.". In the high state, the active device connected to the positive dc bus (source link) is gated "on" and the active device connected to the negative dc bus is gated "off." In the low state, the active device connected to the negative dc bus is gated "on" and the active device connected to the positive dc bus is gated "off." During these states inverter current will flow either in the active device that is gated to the "on" state or in the opposing diode. Conversely, in the blocked state both upper and lower active devices are gated off and current is forced to flow only through the diodes.

During normal control, the inverter legs are switched between the high and low states to manage the dc voltage as desired. When outside forces cause VSI line current to exceed the rating of an active device, overcurrent protection is necessary to prevent damage since the active solid-state devices generally cannot survive a turn-off event under excessive current. In the present invention the VSI control circuitry instantaneously detects the condition and overrides the normal gating to force a blocked state. Normal gating is then resumed as soon as VSI current is within a safe range.

A side effect of such protective action is that the VSI acts like a diode rectifier, and energy will be transmitted through the dc source link in the form of current forcing from the inverter. This current will split between the dc link capacitor and other main dc source circuit components. These other dc source components may take some of this current, or none of it depending upon the nature of those components. (For example, if they consist of a diode rectifier source feeding the dc link, then no current can be absorbed). Irrespective of whether the dc link capacitor takes some or all of this current its voltage will rise.

Since during a fault condition VSI 32 is controlled to act like a diode rectifier and any overcurrent will quickly charge dc link capacitor 35. However, very little charging of link capacitor 35 will occur as a result of low-energy spurious events. A minor current transient of this nature will cause only a small increase in dc link voltage and, once the VSI ac line current drops back within a controllable range, the dc link voltage will return to normal and normal operation of the VSI will resume. Conversely, a major fault will cause a large current surge and a rapid increase in dc link voltage. Consequently, the dc link voltage proves a good indicator to discriminate between events where drastic protection (i.e., crowbar shunting) is required and events where such drastic measures should be postponed to allow a more rapid resumption of normal operation.

In accordance with the present invention, improved crowbar switch circuitry utilizes a diode bridge with a single thyristor on the dc side of the bridge so that only one active device need be gated. Moreover, since an excessive voltage on the dc side of the voltage-source inverter is indicative of an abnormal condition, crowbar switching logic in fie present invention is based on the exceeding of a predetermined threshold voltage monitored at the dc input link. Consequently, in accordance with the present invention, a direct measurement of the dc source link voltage is obtained and the measured value used to determine when to trigger conduction of the thyristor crowbar switch. This approach effectively decouples the fault sensing functions from the power-handling circuit of the crowbar switch. Whenever the dc link voltage exceeds a predetermined threshold, the crowbar switch is triggered to conduct and shunt current through the switch, thus effectively isolating the voltage-source inverter from the power transmission line until the fault is cleared. In addition, in accordance with the present invention; and the VSI is provided with an instantaneous overcurrent protection feature that instantaneously detects an overcurrent condition and overrides the normal gating to block the active portion of each leg whenever the current exceeds a predetermined level.

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout.

DETAILED DESCRIPTION OF THE DRAWINGS

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so not to obscure the description of the present invention with unnecessary detail.

Figure 1:
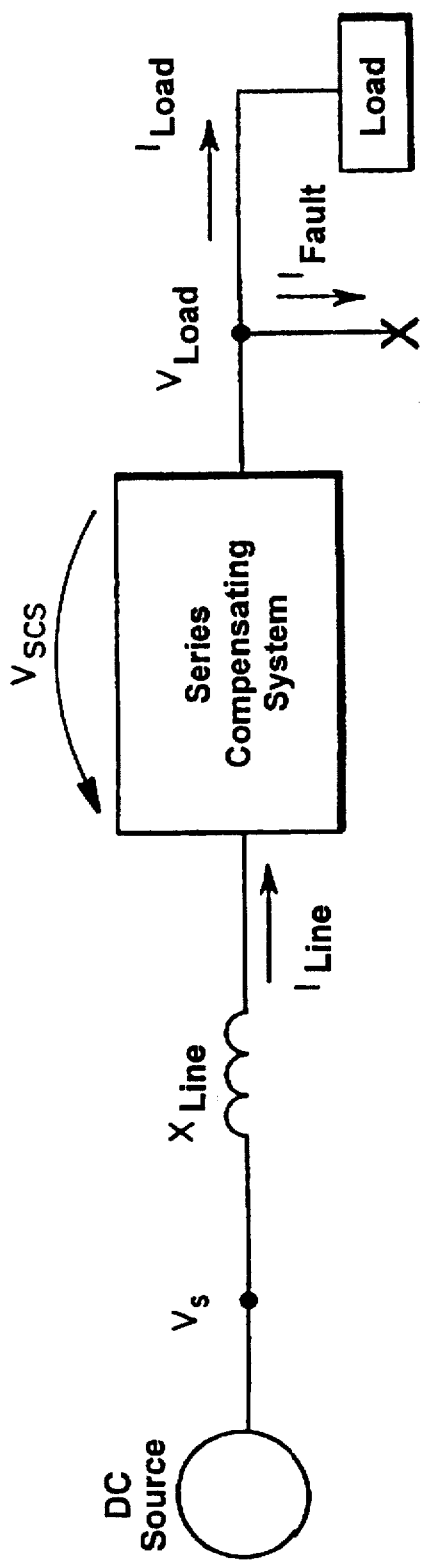
FIG. 1 is a voltage and current flow diagram of an electric power transmission network including a series compensating system with a fault on the transmission line.

FIG. 1 illustrates the basic elements of an electric power transmission system, including a series compensating system, shown with a fault current imposed on the power transmission line. The magnitude of fault current, $I_{Fault}$, is predominantly governed by the source voltage ($V_s$) and series impedance ($X_{Line}$) of the system.

Figure 2:
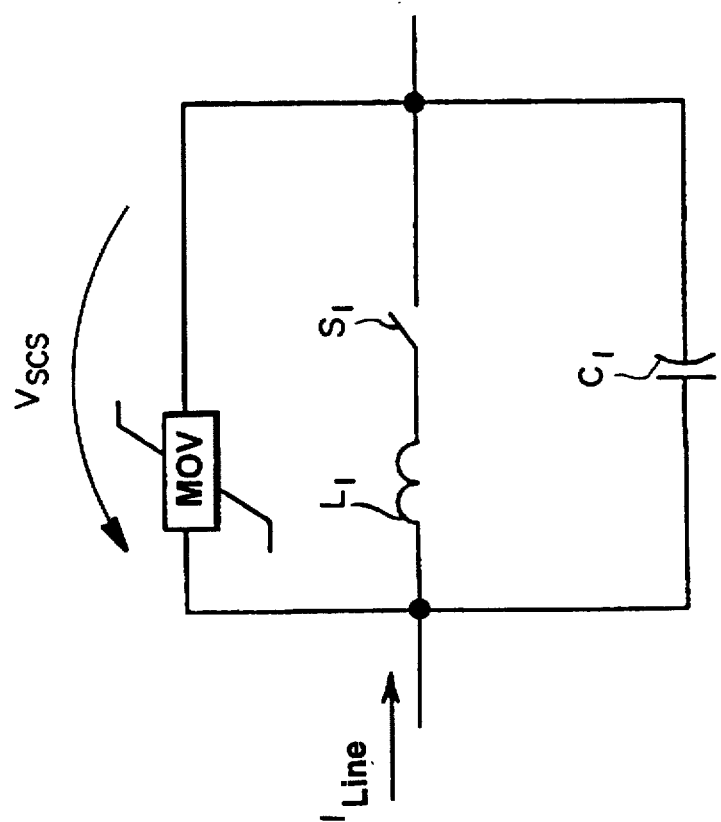
FIG. 2 is a schematic of a conventional prior art protection scheme for a series capacitor compensating system.

FIG. 2 illustrates the basic conventional prior art protection scheme for a series capacitor-type compensating system. In this arrangement the first line of protection consists of an overvoltage-limiting device, such as a metal-oxide varistor (MOB, which provides a absolute limit on the maximum voltage that can be seen by the series compensating device. In addition, to protect the MOV, an active bypass breaker device, $S_1$, is used to shunt excessive currents around the MOV (conventionally three types of bypass switches are used: a fast-closing breaker, a triggered air gap, or a solid-state thyristor arrangement). A current-limiting inductor, $L_1$, is also provided to ensure safe switching.

Figure 3:
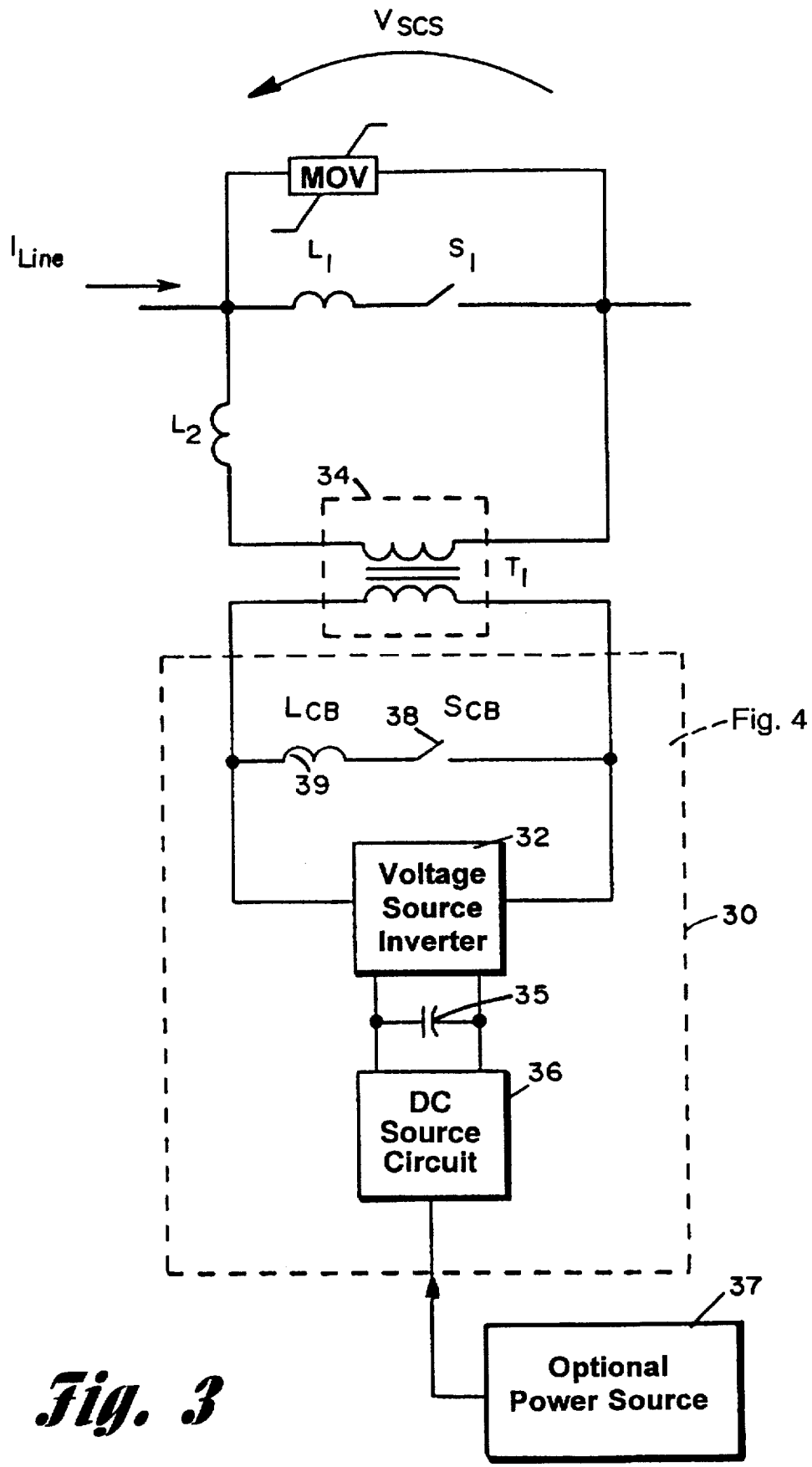
FIG. 3 is a block schematic diagram of a single line (phase) of a three-phase series compensating system in accordance with the present invention.

FIG. 3 depicts the basic circuit configuration for a single phase line (leg) of a three-phase transformer coupled series compensation active power line conditioner 30, in accordance with the invention. The compensating system 30 includes a solid-state three-phase inverter 32 and a series coupling transformer 34 for delivering conditioned ac power from a dc source 36 into the electric power transmission system. A solid-state thyristor crowbar switch 38 is included on the inverter side of coupling transformer 34, directly across the output of inverter 32. A current-limiting inductance, $L_{CB}$, is provided by inductor 39 to insure safe switching of crowbar switch 38. A dc power source circuit 36 and/or optional power source 37 are coupled to inverter 32 via parallel link capacitor 35.

Figure 4:
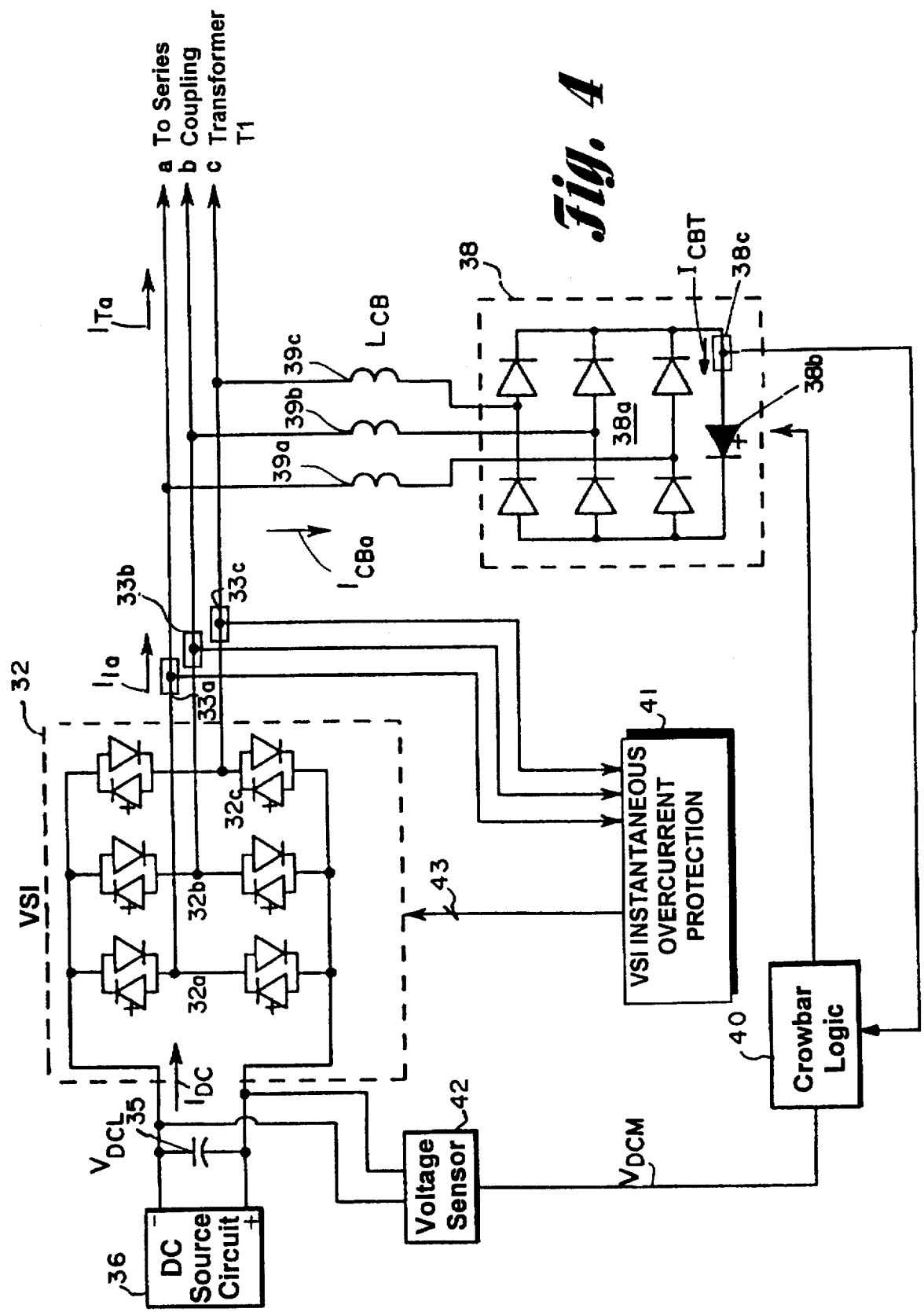
FIG. 4 is a detailed schematic illustrating an exemplary embodiment of a three-phase SCS protection circuit in accordance with the present invention.

Referring now to FIG. 4, a more detailed schematic of an exemplary embodiment of the three-phase SCS protection circuit in accordance with the present invention is illustrated. Three-phase voltage-source inverter 32 comprises a plurality of thyristor switching element pairs 32a–32c, e.g., one pair for each phase leg. Overcurrent detection circuitry 41 monitors current $I_{la}$–$I_{lc}$ on each phase leg using conventional current sensing devices 33a–33c and controls conduction states of thyristor element pairs 32a–32c via control input lines 43 to immediately inhibit the active portion of each phase-leg of voltage-source inverter 32 whenever the current exceeds a predetermined level.

Solid-state crowbar circuit 38 is provided on the inverter side of coupling transformer T1 (not shown), across the output of voltage-source inverter 32, and consists (in its simplest form) of a diode bridge 38a feeding a single thyristor 38b. Nominal current limiting inductors 39b–39c are provided to insure safe switching. Although alternative crowbar switch configurations could also be implemented, such as a back-to-back thyristor combination on each of three phases, a preferred embodiment of the present invention utilizes a diode bridge with a thyristor on the dc side of the bridge (resulting in the simplification that only one active device need be gated per phase leg). Since an excessive voltage at the dc input link to the voltage-source inverter is indicative of an abnormal condition, crowbar switch logic circuit 40 provides a gate trigger signal to thyristor 38b, triggering conduction of crowbar switch 38 if link voltage $V_{DCL}$, sensed by voltage sensor 42, exceeds a predetermined threshold voltage. Consequently, in accordance with the present invention, a direct measure of the dc source link voltage is employed to determine when to trigger the conduction of crowbar thyristor switch 38b.

Crowbar logic 40 and voltage sensor 42 comprise conventional sensing and triggering electronics arranged to turn thyristor 38b "on" when $V_{DCL}$ is greater than a predetermined threshold and turn it "off" when $I_{CBT}$ is less than a predetermined threshold. Once a fault or overcurrent has abated, it is deskable to have some sort of "turn-off" or shut-down capability to redirect current to the VSI and return the system to normal operation (i.e., to open the crowbar short). In the present invention this is most easily accomplished by using a GTO (gate turn-off) type thyristor as the active device in the crowbar switch, however, it may also be accomplished by using a conventional thyristor and including conventional force-commutation circuitry (not shown) as part of the crowbar switch and logic circuitry. Conventional current sensing 38c is employed for monitoring crowbar thyristor current $I_{CBT}$ to determine when the thyristor current has decreased to a level which may be safely handled by the VSI electronics. Once $I_{CBT}$ has decreased to a safe level, crowbar gating logic 40 turns thyristor 38b "off" and allows the VSI to resume handling the current. As would be appreciated by one of ordinary skill in the art, a relatively straightforward conventional arrangement comprising resistors, comparators and discrete logic components may be used to effectuate the voltage sensing and thyristor gating logic functions of the present invention depicted simply by boxes 40-44 in FIGURES 4 and 5.

Figure 5:
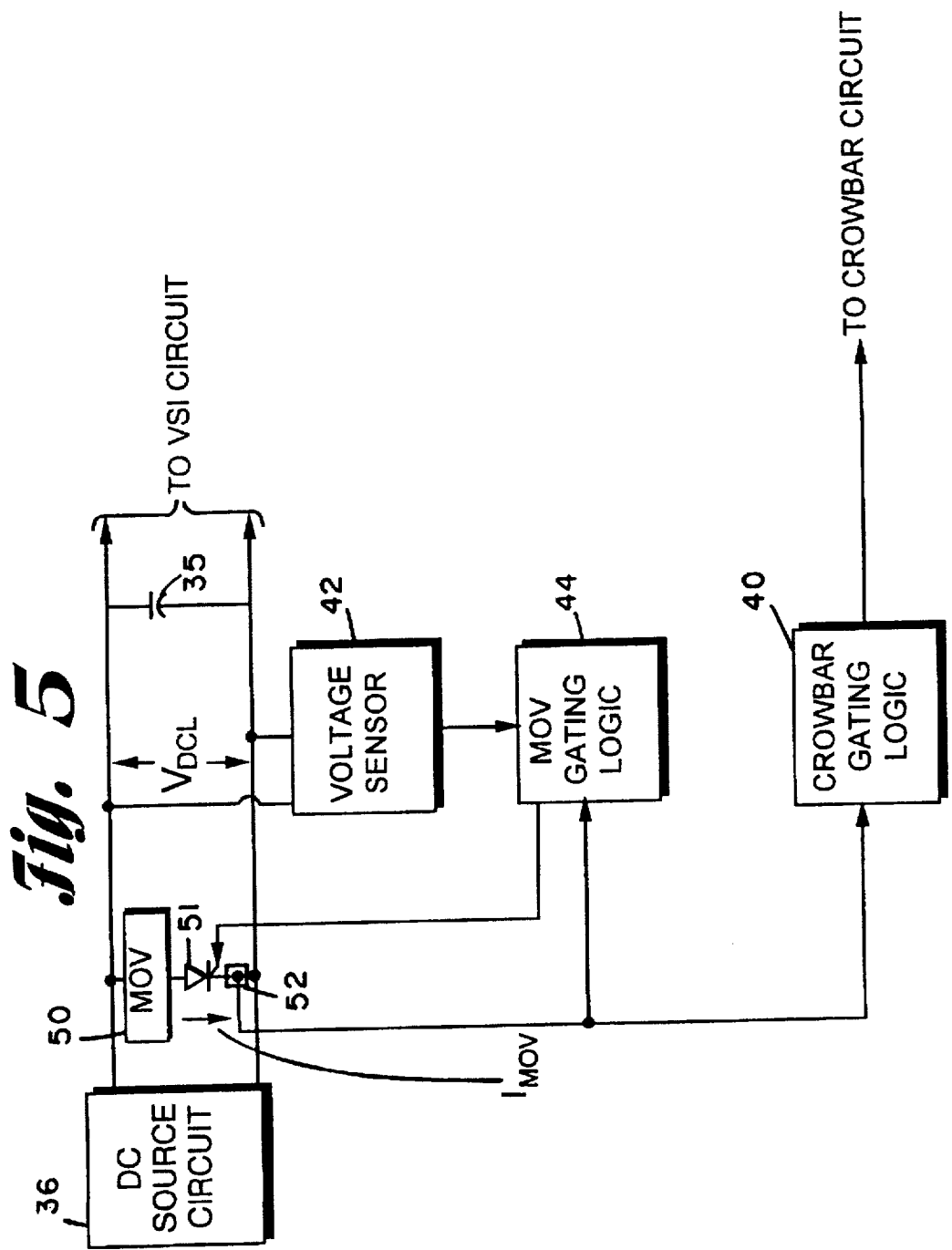
FIG. 5 is a detailed schematic of an alternate embodiment of the present invention for protecting voltage-source inverter power electronics in an electrical power distribution network compensating system.

Referring now to FIG. 5, an additional and/or optional embodiment of the present invention for protecting voltage-source inverter power electronics in an electrical power distribution network compensating system is discussed. In accordance with this further embodiment of the present invention, a thyristor-switched MOV device is provided across the dc source link in parallel with the dc source and the dc link capacitor (VSI circuit not shown). Voltage sensor 42 cooperates with MOV gating logic 44 to detect source link voltages greater than a predetermined reference voltage and to trigger thyristor device (preferably GTO type) 51. Voltage sensor 42 and MOV logic 44 comprise conventional sensing and triggering circuitry configured to instantaneously turn "on" thyristor 51 when dc link voltage, $V_{DCL}$, exceeds a predetermined threshold, thus allowing MOV 50 to shunt slight overcurrents across link capacitor 35. Conventional current sensing 52 provides a measure of MOV current, $I_{MOV}$, to MOV gating logic 44 and crowbar gating logic 40, which allows MOV gating logic 44 to turn thyristor 51 "off" when MOV current drops below a predetermined threshold and crowbar gating logic 40 to activate the crowbar switch (not shown) when the measured MOV amp-seconds exceeds a predetermined threshold. (As previously discussed, crowbar gating logic 40 may also turn the crowbar switch "off" when the crowbar current drops below a predetermined threshold).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An active power-line conditioner arrangement of the type having a transformer coupled compensation circuit including a voltage source inverter having a direct current (DC) input and an alternating current (AC) output said inverter connected to a DC power source, comprising:

an electrical current bypass circuit coupled across an AC output of said inverter; and a fault condition detection circuit connected at a point between said inverter and said DC power source, said fault detection circuit monitoring a first voltage at a DC input to said inverter and generating a fault condition detect signal for activating the electrical current path bypass circuit when said first voltage exceeds a predetermined voltage.

2. In an active power-line conditioner of the transformer coupled type that includes at least one transformer winding coupled to an inverter, said inverter being further coupled to a dc power source, an improved inverter-circuit protection arrangement, wherein the improvement comprises:

shorting means for providing a current path across said winding in response to a fault condition, said shorting means comprising a current rectifying arrangement of diodes and no more than one triggerable semiconductor device.

3. An apparatus as set forth in claim 2 wherein said shorting means includes a series connected inductor as a current limiting device.

4. An active power-line conditioner according to claim 2, wherein said shorting means comprises diodes and a thyristor.

5. An apparatus for protection of voltage-source inverter electronics in an electrical power distribution network, said inverter electronics being coupled to a dc power source, comprising:

fault condition detection circuitry coupled to an input to the inverter electronics at said dc power source, said detection circuitry monitoring a first voltage across said input and generating a fault condition detect signal if said first voltage exceeds a predetermined threshold voltage; and a current bypass circuit, said bypass circuit providing an alternative current path across an ac output of the inverter electronics in response to said fault condition detect signal.

6. The apparatus of claim 5 wherein said fault condition detection circuitry comprises a voltage sensor and fault detection logic circuitry for triggering said current bypass circuit.

7. An apparatus for protection of voltage-source inverter electronics in an electrical power distribution network, comprising:

a solid-state shorting switch means connected across an ac output of said voltage-source inverter electronics for shorting said ac output in response to a detected fault condition; and fault condition detection switching logic means for detecting a fault condition occurring in said electrical power distribution network and triggering conduction of said shorting switch, said fault condition detection switching logic responsive to a voltage measured at a dc power source input to said voltage-source inverter power electronics.

8. The apparatus for protection of voltage-source inverter electronics as set forth in claim 7, wherein said solid-state shorting switch means comprises a current rectifying diode bridge having a thyristor coupled across a dc output of said bridge such that the diode bridge conducts current whenever the thyristor is triggered into conduction.

9. The apparatus for protection of voltage-source inverter electronics as set forth in claim 8, wherein said electrical power distribution network utilizes a three phase power distribution arrangement and an ac input of said current rectifying bridge is electrically coupled to each power phase conduction line.

10. The apparatus for protection of voltage-source inverter electronics as set forth in claim 7, wherein said fault condition detection switching logic comprises a comparator for comparing said fault condition indicative voltage to a reference voltage and generating a fault condition signal for triggering conduction of said shorting switch if said fault condition indicative voltage exceeds said reference voltage by a predetermined value.

11. The apparatus for protection of voltage-source inverter electronics as set forth in claim 7, wherein said solid-state shorting switch means includes a series connected inductor as a current limiting device.

12. An active power-line conditioner for three-phase power distribution systems, said power-line conditioner of the type having an electrical power series compensation arrangement that includes a series transformer coupled to an inverter circuit, said inverter circuit being further coupled to a dc power source, said power-line conditioner comprising:

a solid-state fault-condition current bypass circuit coupled across said transformer, said current bypass circuit comprising a three-phase diode rectifying bridge and a single active (triggerable) semiconductor device connected across a dc side of said diode bridge, said active semiconductor device having a trigger input coupled to a fault condition detection circuit, wherein the active semiconductor device is triggered into conduction by said fault condition detection circuit so as to short said first transformer winding via said diode bridge thereby protecting said inverter circuit during occurrence of a fault condition.

13. The active power-line conditioner of claim 12 wherein said three-phase diode rectifying bridge consists of three pairs of diodes.

14. An improved active power-line conditioner of the type having a series compensation arrangement that includes a series transformer having first and second inductively coupled windings, said first winding coupled to an inverter, said series inverter being further coupled to a dc power source via a parallel linking capacitor, wherein the improvement comprises:

a solid-state fault condition shorting circuit coupled to said transformer first winding, said fault condition shorting circuit comprising:

fault condition detection switching logic coupled across said linking capacitor for monitoring a first voltage at a dc input to said inverter and generating a fault condition detect signal if said first voltage exceeds a predetermined threshold voltage; and an electrical current conductive bridge consisting of at least a pair of diodes and a thyristor, said bridge connected across said transformer first winding conveys diode bridge current only in the presence of a fault condition; and said thyristor connected across a dc side of said diodes and having a triggering gate coupled to said fault condition detection switching logic circuit, said thyristor being triggered into conduction by said fault condition detect signal so as to short said transformer first winding via said diode bridge in the presence of a fault condition.

15. The improved active power-line conditioner as set forth in claim 14, wherein said fault condition detection switching logic comprises a comparator for comparing said first voltage to a reference voltage and generating said fault condition signal for triggering conduction of said thyristor if said first voltage exceeds said reference voltage by a predetermined value.

16. The improved active power-line conditioner as set forth in claim 14, wherein said series compensation arrangement accommodates a three phase electrical power distribution network and wherein said series compensation arrangement further includes an overcurrent detection circuit coupled to a three phase series inverter directly at each AC output, said overcurrent detection circuit directly controlling each phase leg of said three phase series inverter to immediately inhibit conduction of current through said inverter whenever detected current exceeds a predetermined level.

17. A method for the protection against electrical damage of a voltage-source inverter in a power compensation circuit for an electrical power distribution network, said method comprising:

(a) monitoring a voltage at a dc power source input interface to said voltage-source inverter to detect a fault condition of said electrical power distribution network; and (b) providing an electrical current path across an ac output interface of said voltage-source inverter to said electrical power distribution network in response to a voltage indicative of a fault condition.

18. The method of claim 14 wherein said monitoring step (a) includes comparing said voltage at said dc power source input interface to a reference voltage and generating a fault condition signal for initiating step (b) if said fault condition indicative voltage exceeds said reference voltage by a predetermined value.

19. The method for the protection of voltage-source inverter power electronics according to claim 14, further including steps of:

monitoring for overcurrents in said voltage-source inverter and controlling each electrical phase leg of said voltage-source inverter electronics individually to inhibit conduction whenever a detected current exceeds a predetermined level.

20. An active power-line conditioner of the type having a power compensation circuit that includes an inverter coupled to a dc power source, comprising:

a thyristor-switched MOV electrical current path bypass arrangement connected in parallel with said dc source across a dc input to said inverter, said thyristor-switched MOV arrangement comprising an MOV connected in series with a thyristor; and MOV gating logic circuit connected to a trigger input of said thyristor, a voltage sensing device across said dc input to said inverter, said MOV gating logic generating a signal for triggering conduction of said thyristor in response to a predetermined voltage sensed by said voltage sensing device.

21. The power-line conditioner of claim 20 wherein said MOV gating logic includes means for terminating conduction of current through said thyristor-switched MOV in response to current through said MOV below a predetermined threshold.

22. A method for the protection against electrical damage of voltage-source inverter (VSI) components of a power compensating circuit for an electrical power distribution network, said method comprising the steps of:

(a) monitoring voltage at a dc power source input interface to a voltage-source inverter of said power compensating circuit; and (b) providing an electrical current bypass path at said dc power source input interface for shorting said dc input to said inverter in response to a voltage indicative of an overcurrent condition.

23. The method of claim 22 wherein said current bypass path is provided by an MOV device in series with a triggerable semiconductor device.

24. The method of claim 22 further including steps of monitoring current passing through said current bypass path and activating a second current bypass shorting path positioned across an AC output of said VSI in response to detecting a monitored current greater than a predetermined value.

* * * * *